(12) United States Patent
Lee

(10) Patent No.: US 8,093,841 B1
(45) Date of Patent: Jan. 10, 2012

(54) SYSTEM AND METHOD FOR FASTER RESPONSE TIME IN STEREO/MONO DETECTION

(75) Inventor: Chris Cheng-Chieh Lee, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 1124 days.

(21) Appl. No.: 11/871,755

(22) Filed: Oct. 12, 2007

Related U.S. Application Data

(60) Provisional application No. 60/829,202, filed on Oct. 12, 2006.

(51) Int. Cl.
*H04H 40/81* (2008.01)
*H04H 40/54* (2008.01)
*H04H 40/72* (2008.01)
*H04B 1/10* (2006.01)

(52) U.S. Cl. ............... 318/11; 381/10; 381/12; 381/13; 455/283; 455/296

(58) Field of Classification Search .............. 381/11, 381/12, 13, 10; 455/283, 296
See application file for complete search history.

(56) References Cited

U.S. PATENT DOCUMENTS
4,703,501 A * 10/1987 Sugai et al. ............... 381/10
* cited by examiner

*Primary Examiner* — Xu Mei
*Assistant Examiner* — Douglas Suthers

(57) ABSTRACT

An audio receiver may include a mono/stereo detector that causes the audio receiver to output either a monophonic or a stereophonic signal based on a difference between a pilot energy signal and a filtered pilot energy signal. The audio receiver includes a filter that filters the pilot energy signal to generate a filtered pilot energy signal, wherein a variable leakage factor associated with the filter is used to minimize a noise level of the filtered pilot energy signal and to reduce a response time of the audio receiver.

24 Claims, 9 Drawing Sheets

SYSTEM AND METHOD FOR FASTER RESPONSE TIME IN STEREO/MONO DETECTION

INCORPORATION BY REFERENCE

This application claims the benefit of U.S. Provisional Application No. 60/829,202, "Method and Algorithm to Estimate the Channel Condition Based on Filtered Pilot Energy Signal" filed on Oct. 12, 2006, incorporated herein by reference in its entirety.

BACKGROUND

This present disclosure relates to a system and method for improving response time of a receiver by varying a leakage factor of a filter, and more particularly, a system and method capable of improving the stereophonic/monophonic detection of broadcast audio signals.

Receivers that detect stereophonic/monophonic signals are incorporated into a vast number of devices used in everyday life. For example, such receivers are used in automobile radios, a variety of communication systems such as cellular telephones, and even children's toys. Unfortunately, many modern receiver systems suffer from such performance shortfalls as frequent switchover between monophonic and stereophonic modes.

In order to receive FM audio signals, be they music or any other type of information, a receiver must be robust enough to handle changes in the channel wherein the transmission could become very noisy and/or must overcome interference. A pilot tone can be transmitted as part of the baseband signal that is used to modulate an FM carrier signal in order to indicate the nature of the transmission to be stereophonic. The energy of the pilot tone may fluctuate significantly in a harsh channel scenario. Simply comparing the pilot tone energy, estimated at the receiver, against a predetermined threshold may cause the receiver to switch between monophonic and stereophonic mode too frequently and degrade the entertainment quality of the audio program delivered to the consumer.

SUMMARY

An audio receiver is disclosed that includes a mono/stereo detector that causes the audio receiver to output either a monophonic or a stereophonic signal based on a residual signal that is indicative of a difference between a pilot energy signal and a filtered pilot energy signal. The audio receiver includes a filter that filters the pilot energy signal to generate a filtered pilot energy signal, wherein a variable leakage factor associated with the filter is used to minimize a noise level of the filtered pilot energy signal and to reduce a response time of the receiver.

A noise energy comparator, which may also be included in the audio receiver, compares the residual energy signal with a noise energy threshold to generate a channel condition signal.

Furthermore, a pilot energy comparator, which may also be included in the audio receiver, compares the filtered pilot energy signal with a pilot energy threshold to generate an energy level signal.

Based on the channel condition signal and the energy level signal of the pilot energy signal, a decoder of the audio receiver outputs either the monophonic signal or the stereophonic signal. In particular, if either the channel condition or the energy level of the pilot energy signal do not meet the threshold requirements of the audio receiver, the decoder outputs the monophonic signal. Otherwise, the decoder outputs the stereophonic signal.

BRIEF DESCRIPTION OF THE DRAWINGS

Embodiments of the receiver incorporating the mono/stereo detector (MSD) will be described with reference to the following drawings, wherein like numerals designate like elements, and wherein.

DETAILED DESCRIPTION OF EMBODIMENTS

Figure 1:
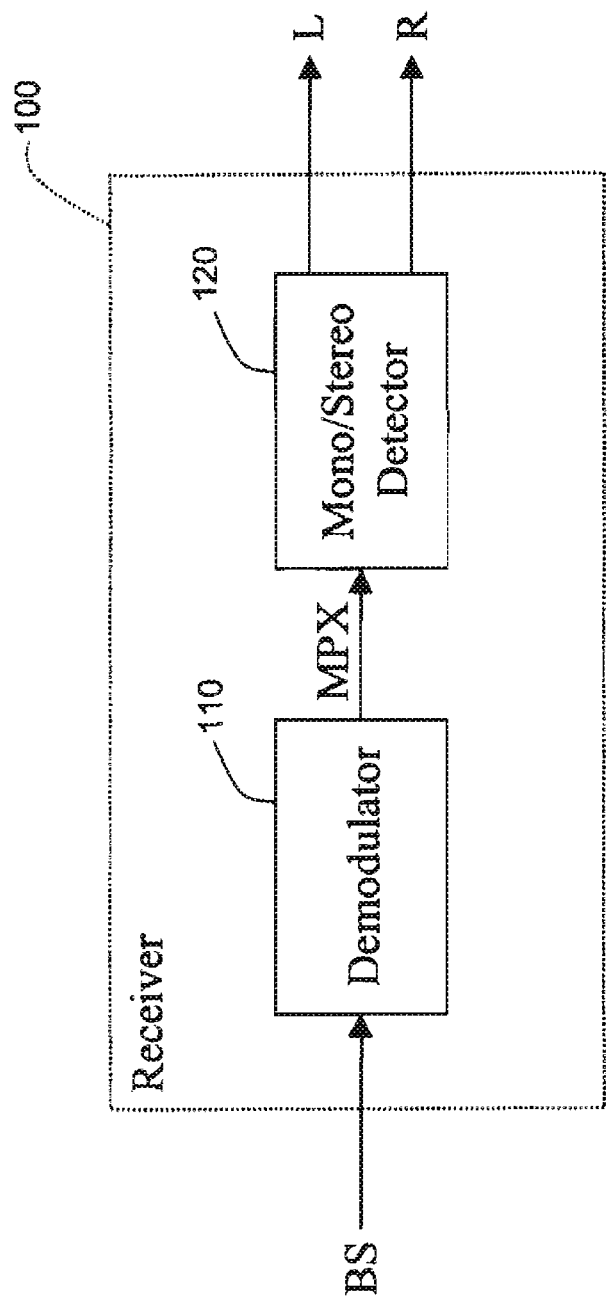
FIG. 1 shows a block diagram of an exemplary receiver incorporating MSD.

FIG. 1 shows a receiver 100 having a mono/stereo detector (MSD) 120 that is capable of robust and flexible detection of stereophonic signals. As shown in FIG. 1, mono/stereo detector 120 is coupled to a demodulator 110, which receives a base line signal BS from a transmitter (not shown). Demodulator 110 demodulates base line signal BS into a multiplex signal MPX and then transmits multiplex signal MPX mono/stereo detector 120. Mono/stereo detector 120 receives and processes multiplex signal MPX and outputs the processed signal in the form of a left signal L and a right signal R, which may then be amplified by an amplifier (not shown) and used to drive a left and a right speaker (not shown), respectively. Depending on the presence and the state of a pilot tone component in the multiplex signal MPX, the mono/stereo detector 120 may output either left and right signals L and R in a stereophonic form or a monophonic form.

Figure 2:
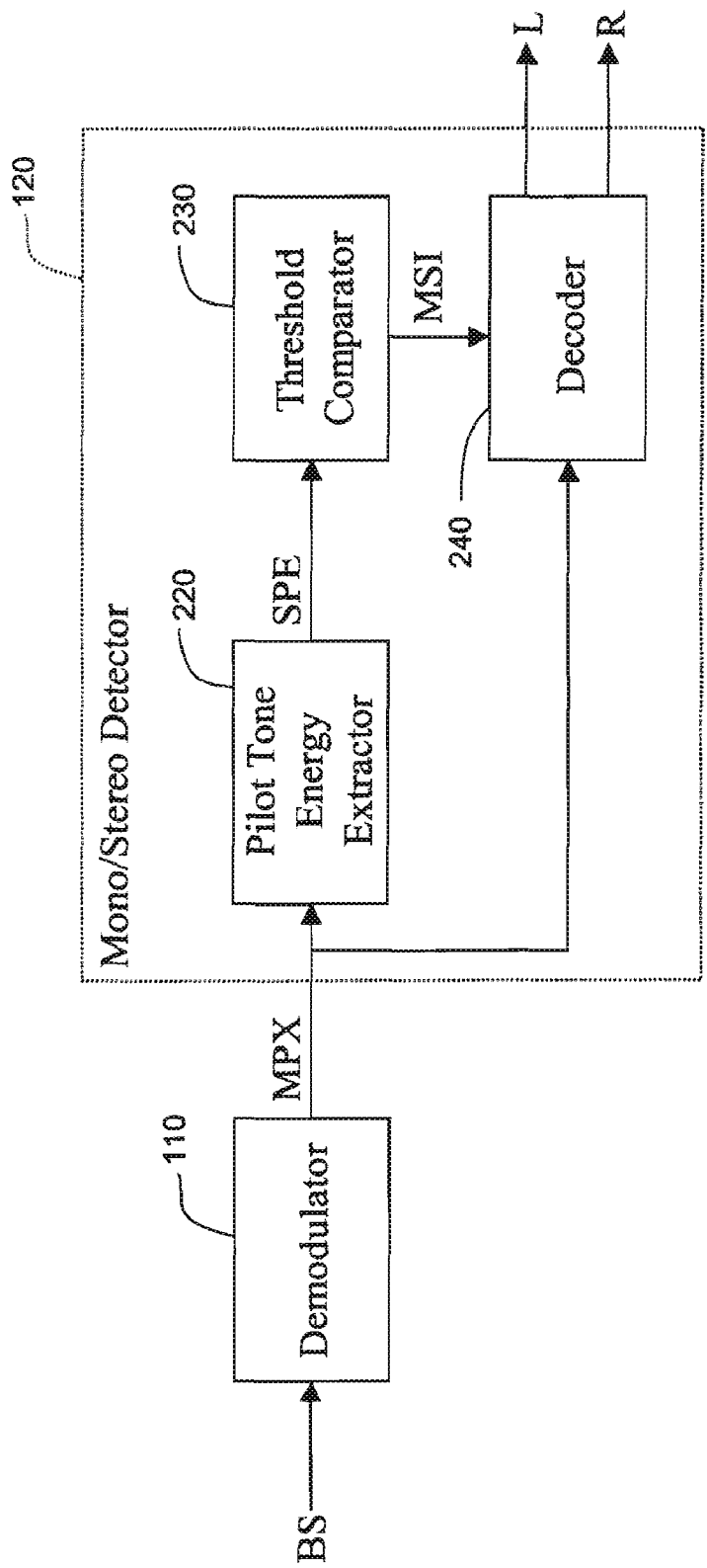
FIG. 2 shows a block diagram of exemplary MSD shown in FIG. 1.

FIG. 2 shows a block diagram of mono/stereo detector 120. As can be seen, mono/stereo detector 120 can include a pilot tone energy extractor 220, a threshold comparator 230, and a decoder 240, which are described in greater detail with reference to FIGS. 3, 4, and 5, respectively.

During operation, when multiplex signal MPX is transmitted to mono/stereo detector 120, it is received by pilot tone energy extractor 220 and decoder 240. Pilot tone energy extractor 220 extracts and processes a pilot tone signal and converts it into a sample pilot energy signal SPE, which is a measure of pilot energy per audio sample. Sample pilot energy signal SPE is then transmitted to threshold comparator 230, which compares signal SPE to various pre-set parameters (e.g., energy and noise thresholds) and outputs a mono/stereo indicator signal MSI that controls the output of decoder 240.

As mentioned above, decoder 240 also receives and processes multiplex signal MPX. Decoder 240 utilizes various filters and algorithms to extract left and right signals L and R from multiplex signal MPX for output by receiver 100. However, whether left and right signals L and R are stereophonic or monophonic will depend on what MSI signal decoder 240 receives from threshold comparator 230. For example, if the MSI signal indicates that the energy of the detected pilot tone signal is sufficient and meets a predetermined noise requirement, decoder 240 will output left and right signals L and R in stereophonic form. Whereas, if the MSI signal indicates that the energy of the detected pilot tone signal is insufficient or fails to meet the predetermined noise requirement, decoder 240 will output left and right signals L and R in monophonic form. As such, a robust and flexible detection of stereophonic signals can be achieved.

Figure 3:
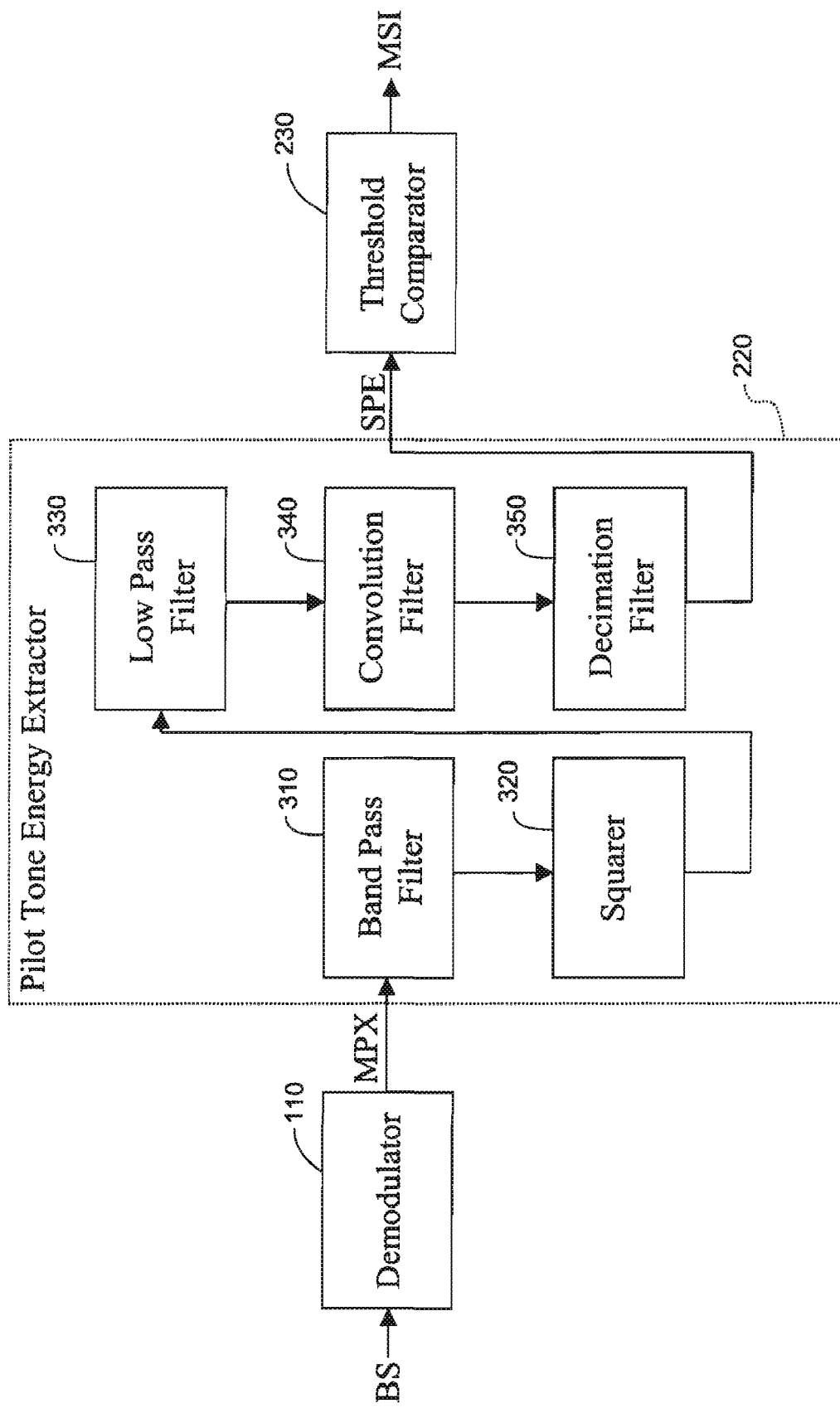
FIG. 3 shows a block diagram of an exemplary pilot tone energy extractor of FIG. 2.

FIG. 3 shows a block diagram of an exemplary pilot tone energy extractor 220 of FIG. 2. In particular, pilot tone energy extractor 220 can include a band pass filter 310, a squarer 320, a low pass filter 330, a convolution filter 340, and a decimation filter 350.

The band pass filter 310 defines a predetermined shape of the frequency response over a band of frequency, such that its output is the appropriately shaped version of the MPX input. For example, in one embodiment, band pass filter 310 may be tuned to the 19 kHz pilot tone signal. The signal extracted from the squarer 320 mainly includes a DC component representing the pilot signal power and a second harmonic tone of 38 kHz along with residue of the channel noise and interference. Next, the low pass filter 330 outputs the DC component along with the low pass filter shaped noise component. The convolution filter 340 accumulates or averages the signal over a predetermined and programmable time interval governed by $N_o$ samples, where $N_o$ is an integer >0.

The decimation filter 350 outputs every $N_o^{th}$ sample of its input. As a combined processing entity, the convolution filter 340 along with the decimation filter 350, make up a window accumulator wherein the window defines a time duration such that the successive windows can be contiguous and at non-overlapping time intervals. The output of the decimation filter 350 are the pilot energy samples averaged over the window time duration of $N_o$ samples.

The signal samples output by decimation filter 350 are the sample pilot energy signal SPE which can be subsequently fed to threshold comparator 230. The SPE samples are further processed in the threshold comparator 230 and converted into mono/stereo indicator signal MSI for transmission to decoder 240.

Figure 4:
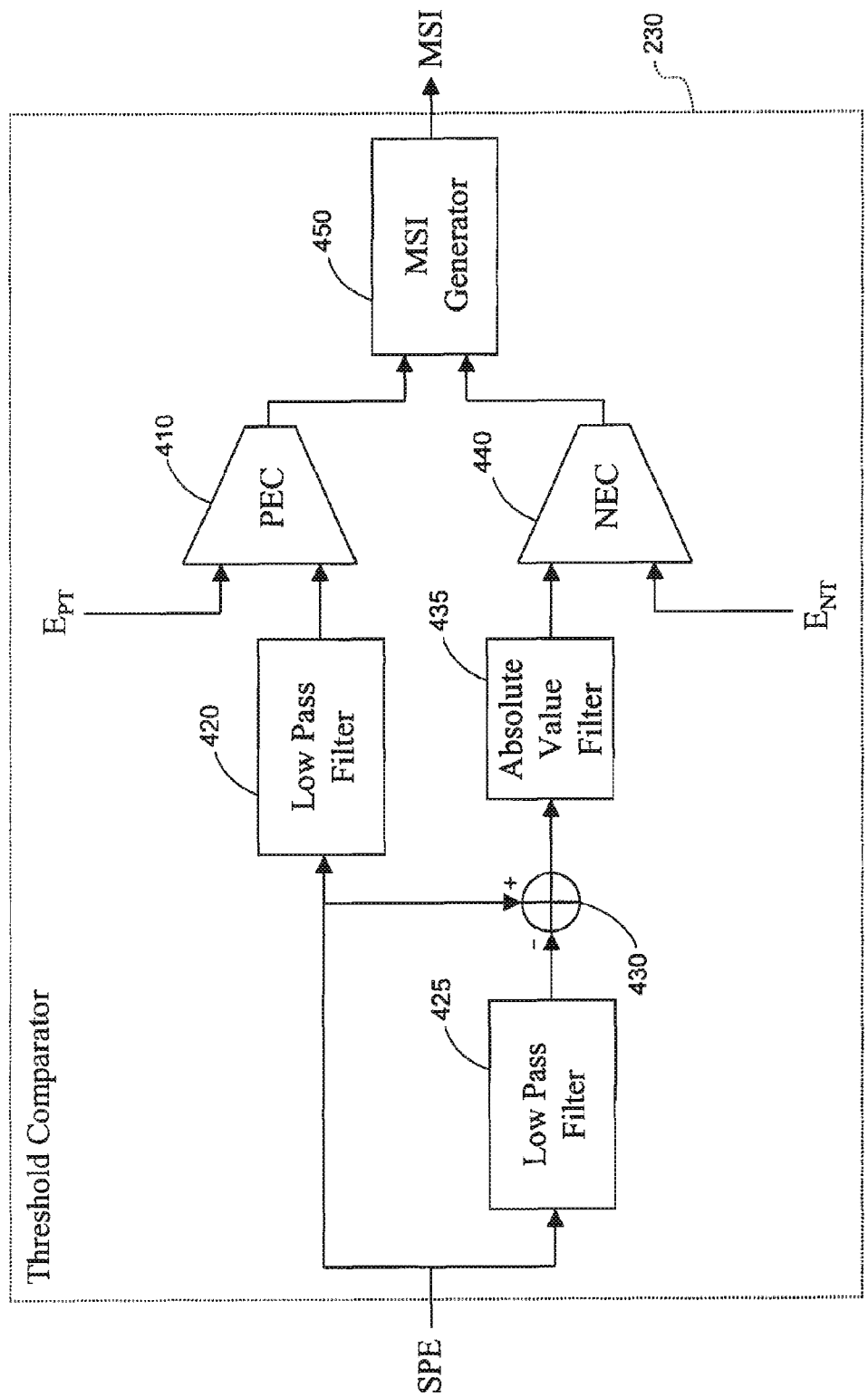
FIG. 4 shows a block diagram of an exemplary threshold comparator of FIG. 2.

FIG. 4 shows a block diagram of threshold comparator 230 that processes and converts sample pilot energy signal SPE into mono/stereo indicator signal MSI. As shown, threshold comparator 230 can include pilot energy comparator (PEC) 410 for comparing a filtered pilot energy signal SPE with a predetermined pilot energy threshold $E_{PT}$, low pass filters 420 and 425 for filtering the sample pilot energy signal, a signal subtractor 430 for obtaining a difference signal, an absolute value filter 435 for taking the absolute value of the difference signal and producing a residual signal, a noise energy comparator (NEC) 440 for comparing the noise energy of the residual signal with a predetermined noise energy threshold $E_{NT}$, and an MSI generator 450 for performing a logic function on the outputs of comparators PEC 410 and NEC 440.

During operation, sample pilot energy signal SPE is received by threshold comparator 230, and then transmitted to low pass filter 420 and low pass filter 425. At low pass filters 420 and 425, sample pilot energy signal SPE is "smoothed" and transmitted to pilot energy comparator 410 and signal subtractor 430, respectively, as a smooth pilot energy signal. It should be appreciated that low pass filters 420 and 425 can be 1-tap IIR filters, or any other kind of low pass filters suitable for "smoothing" or reducing the noise level of sample pilot energy signal SPE. Also, low pass filters 420 and 425 can be a single filter. Furthermore, as will be later described with respect to FIGS. 6, 7, and 8, low pass filters 420 and 425 may haven constant or a varying leakage factor ρ.

As the pilot energy comparator 410 receives the sample pilot energy signal SPE, it compares it with predetermined pilot energy threshold $E_{PT}$, and outputs a signal to MSI generator 450 indicating whether the sample pilot energy signal SPE has sufficient energy to be indicative of a reliable stereophonic signal. For example, if sample pilot energy signal SPE is below predetermined pilot energy threshold $E_{PT}$, then pilot energy comparator 410 can transmit a "mono-on" signal to MSI generator 450, indicating that receiver 100 should remain in or switch to monophonic mode. On the other hand, if sample pilot energy signal SPE is at or above predetermined pilot energy threshold $E_{PT}$, then pilot energy comparator 410 can transmit a "stereo-on" signal to MSI generator 450, indicating that receiver 100 should remain in or switch to stereophonic mode.

Low pass filter 425, signal subtractor 430, absolute value filter 435, and noise energy comparator 440 collectively constitute a channel condition measurement stage, where the noise energy level of the sample pilot energy signal SPE is measured, and a signal is generated that indicates whether the noise energy is acceptable for stereophonic output by receiver 100.

Once sample pilot energy signal SPE is smoothed by low pass filter 425, it is transmitted to signal subtractor 430 where the difference between the smooth pilot energy signal and the original sample pilot energy signal SPE is calculated. The difference is then processed by absolute value filter 435 and transmitted as a residual signal to noise energy comparator 440.

Residual signal can be used to indicate the relative condition of the channel. For example, when the channel is clean, residual signal tends to be weak. Otherwise, when the channel is noisy, residual signal tends to be strong and thus, has high energy. Noise energy comparator 440 computes a total energy of the residual signal in a given time block or interval (e.g., ~0.0232 seconds) of the base line signal with, for example, an L1-norm filter (not shown) that sums up absolute values of the residual signal, and compares this energy with predetermined noise energy threshold $E_{NT}$. For example, if the total energy of the residual signal in the block is equal to or greater than that of noise energy threshold $E_{NT}$, then noise energy comparator 440 can transmit a "mono-on" signal to MSI generator 450. On the other hand, if the total energy of the residual signal of the block is less than that of noise energy threshold $E_{NT}$, then noise energy comparator 440 can transmit a "stereo-on" signal to MSI generator 450.

MSI generator 450 receives "mono-on" or "stereo-on" indicator signals from pilot energy comparator 410 and noise energy comparator 440, respectively, and performs a logic operation on the signals. MSI generator 450, for example, can be a logic gate that performs a logic AND operation, or the like. If either of the signals from PEC and NEC 410 and 440 is a "mono-on" signal, then MSI generator 450 will output MSI signal instructing decoder 240 to remain in or switch to monophonic mode. MSI generator 450 will output MSI signal instructing decoder 240 to remain in or switch to stereophonic mode only when both output signals from PEC and NEC 410 and 440 are "stereo-on" signals.

Figure 5:
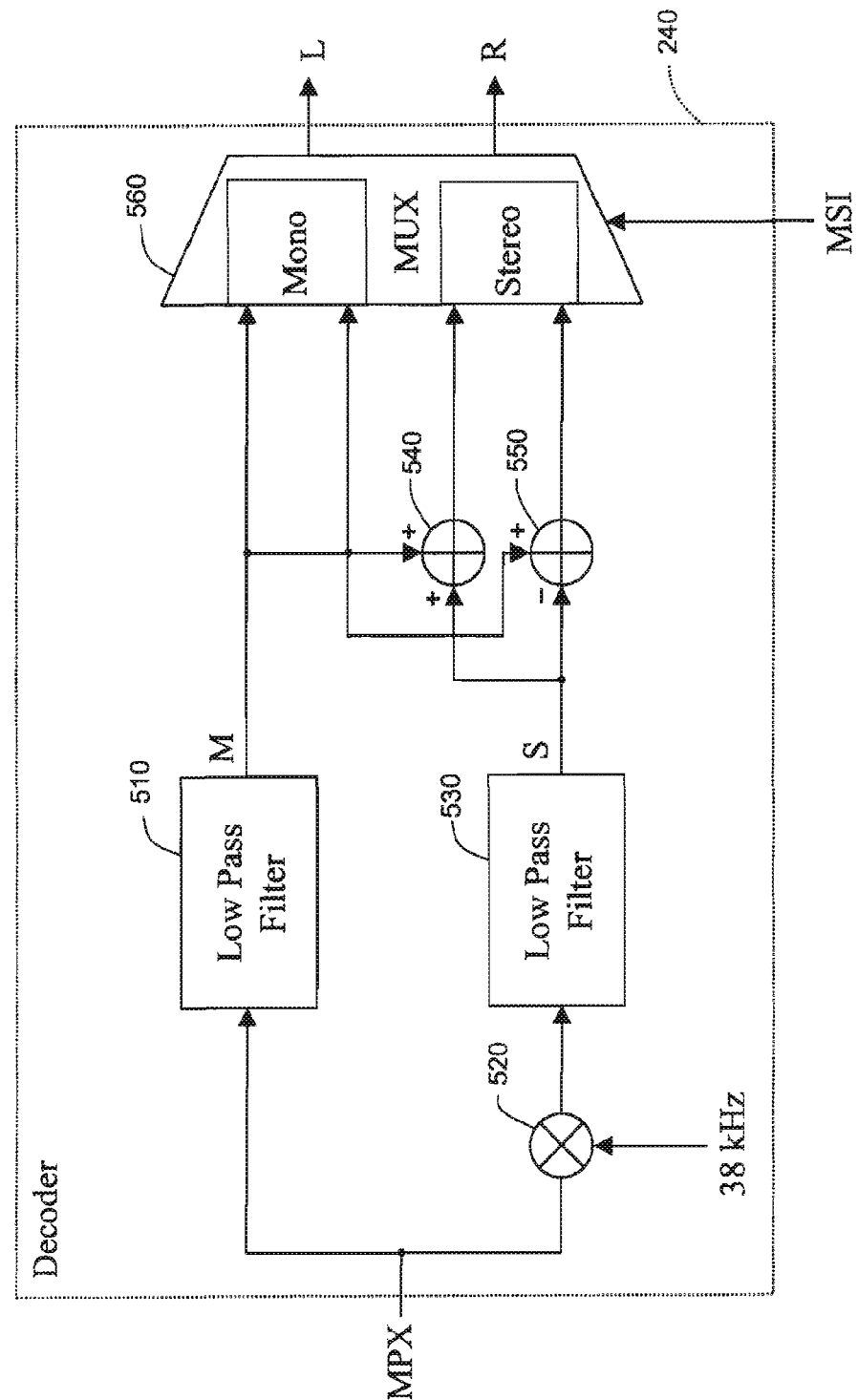
FIG. 5 shows a block diagram of an exemplary decoder of FIG. 2.

FIG. 5 shows decoder 240 that decodes multiplex signal MPX into left and right signals L and R. Decoder 240 can include two low pass filters 510 and 530, a signal multiplier 520, a signal adder 540, a signal subtractor 550, and a multiplexer (MUX) 560.

In operation, multiplex signal MPX is processed in two signal paths. In a first signal path, low pass filter 510 isolates a sum signal M, which contains half of the sum of left and right signals L and R, from multiplex signal MPX. In a second signal path, signal multiplier 520 multiplies multiplex signal MPX by a 38 kHz auxiliary carrier (obtained, for example, from 19 kHz pilot tone), and low pass filter 530 isolates a difference signal S, which contains half of the difference between the left and right signals L and R. Then, M and S signals are summed and subtracted by signal adder 540 and signal subtractor 550, respectively, and transmitted to a stereo input section (Stereo) of multiplexer 560. Furthermore, signal M is transmitted to a mono input section (Mono) of multiplexer 560. Multiplexer 560 then receives mono/stereo indicator signal MSI, and, based on signal MSI, selects either the stereo signals or the mono signals for output on the L and R channels. As such, a robust and flexible detection of stereophonic signals can be achieved.

Figure 6:
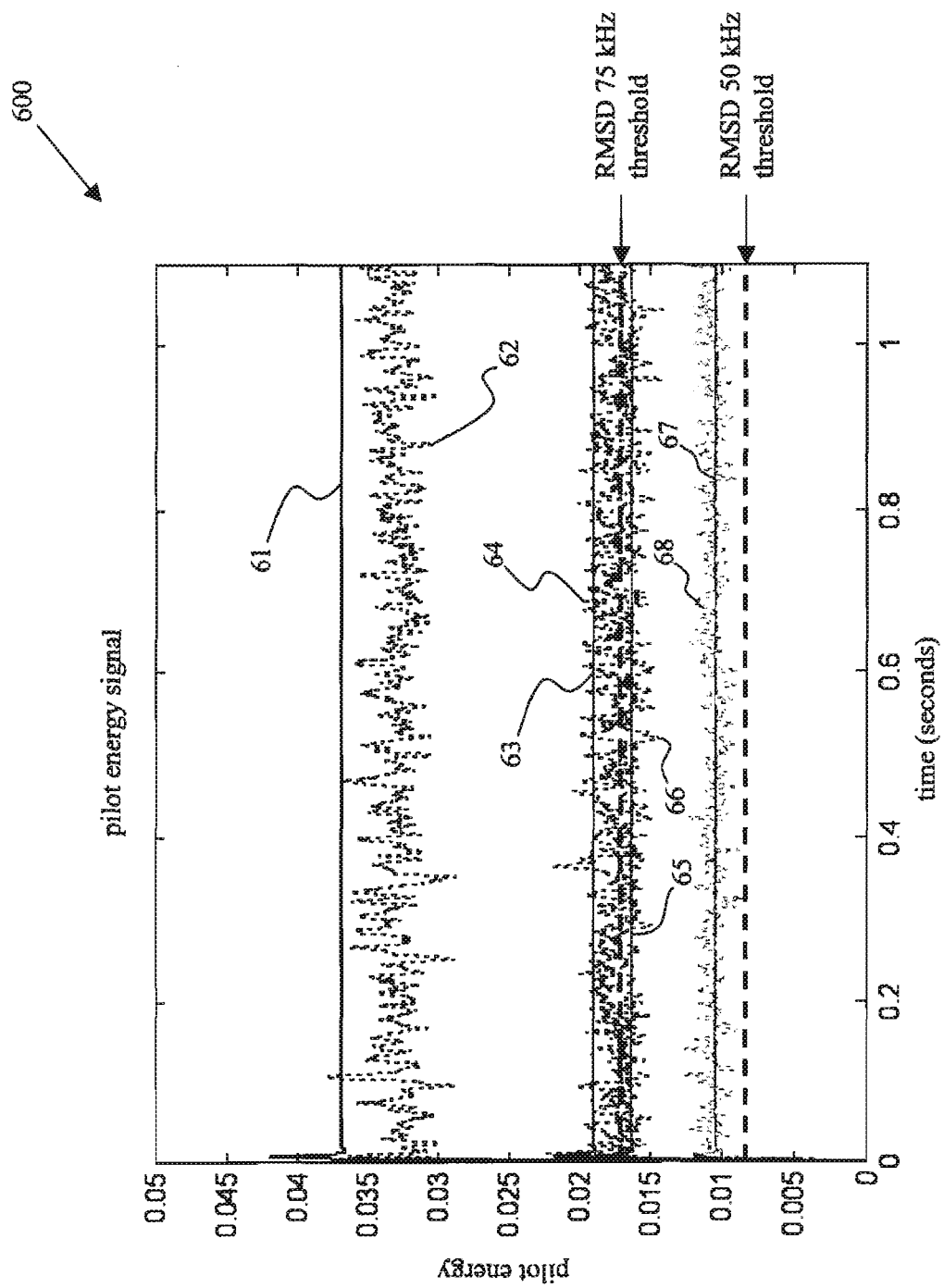
FIG. 6 shows a plot of a monitored unfiltered pilot energy signal.
Figure 7:
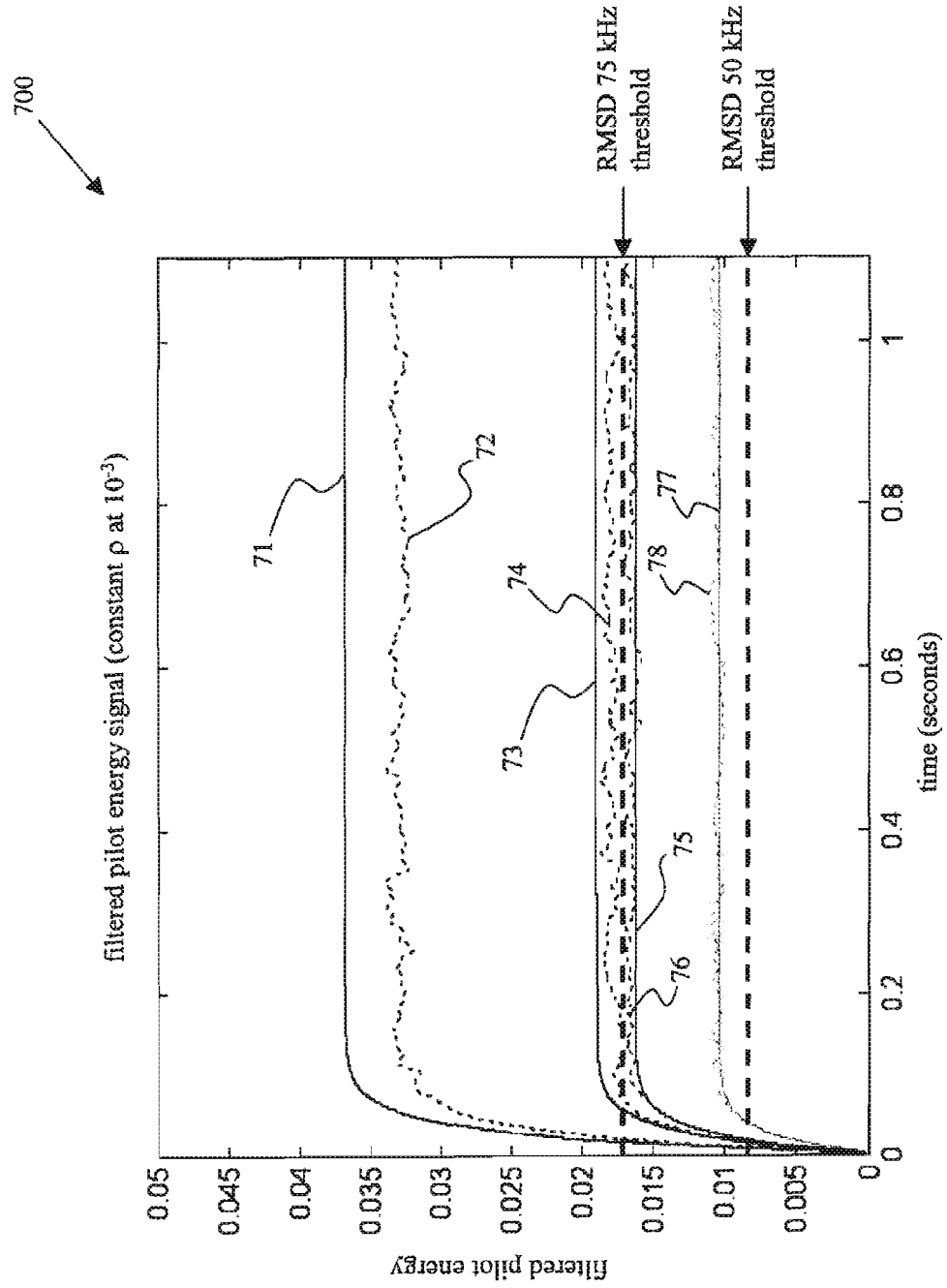
FIG. 7 shows a plot of a monitored filtered pilot energy signal using a constant leakage factor $\rho$.
Figure 8:
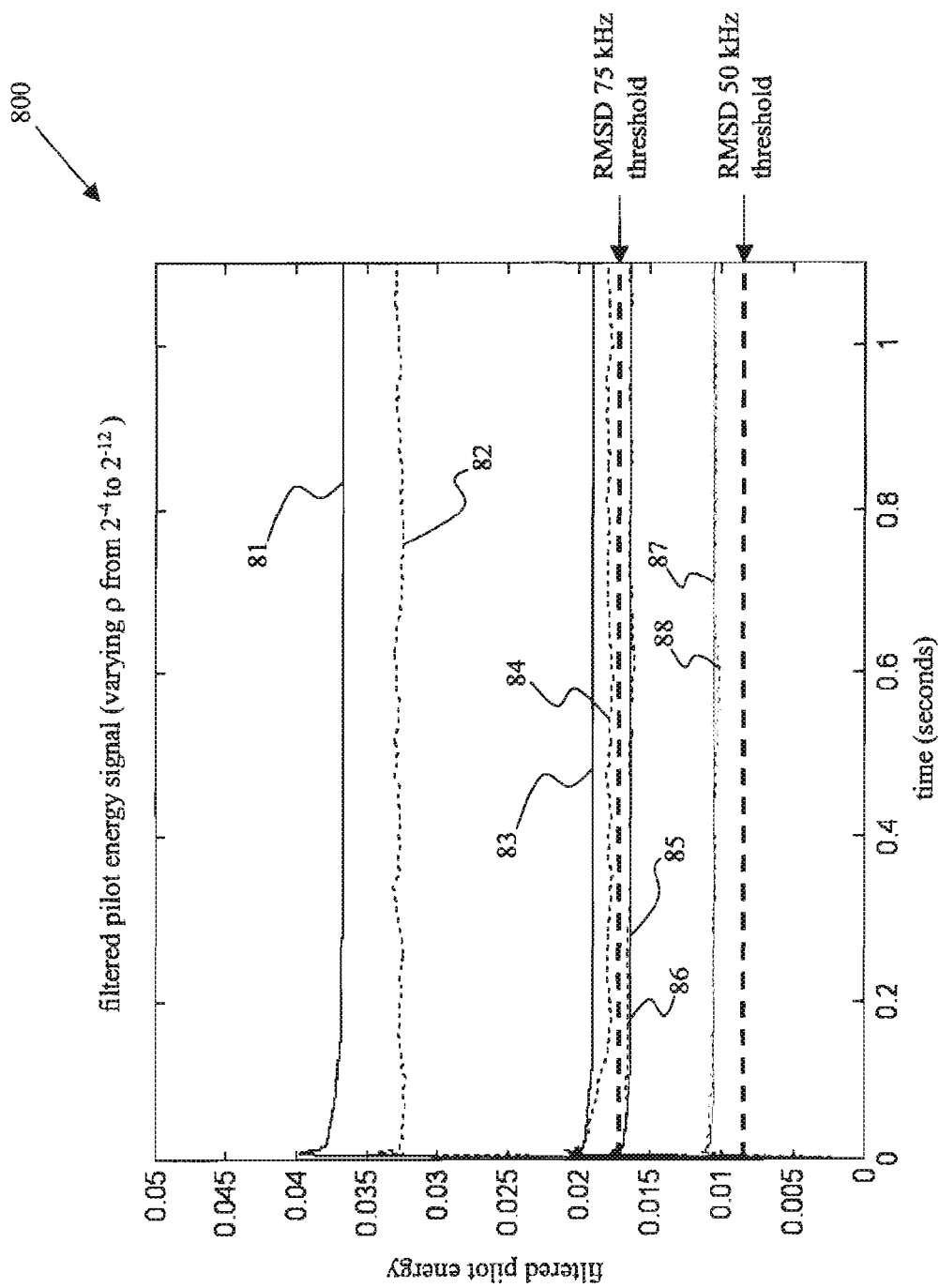
FIG. 8 shows a plot of a monitored filtered pilot energy signal using a varying leakage factor $\rho$.

FIGS. 6, 7, and 8 show diagrams 600, 700, and 800, respectively, that illustrate results of simulations for filtered and unfiltered pilot energy signals in both clean and noisy channel environments.

FIG. 6 shows a diagram 600 that illustrates results of a simulation for an unfiltered pilot energy signal similar to signal SPE described in FIG. 4. This simulation illustrates how various pilot energy signals fluctuate without being smoothed by a low pass filter, such as one of low pass filters 420 or 425 described in FIG. 4.

The simulations were performed for the following signals; RMSD of 75 kHz with a clean pilot energy signal 61 at 10% of full scale; RMSD of 75 kHz with a noisy pilot energy signal 62 at 10% of full scale; RMSD of 75 kHz with a clean pilot energy signal 63 at 7.2% of full scale; RMSD of 75 kHz with a noisy pilot energy signal 64 at 7.2% of full scale; RMSD of 50 kHz with a clean pilot energy signal 65 at 10% of full scale; RMSD of 50 kHz with a noisy pilot energy signal 66 at 10% of full scale; RMSD of 50 kHz with a clean pilot energy signal 67 at 8% of full scale; and RMSD of 50 kHz with a noisy pilot energy signal 68 at 8% of full scale. RMSD 50 kHz and 75 kHz signal thresholds are delineated by thick dashed lines.

As shown in FIG. 6, unfiltered clean pilot energy signals 61, 63, 65, and 67 are flat and do not fluctuate. However, the unfiltered noisy pilot energy signals 62, 64, 66, and 68 can fluctuate wildly. Nonetheless, a response time for all of these signals is almost zero. That is, after the receiver is reset or a new radio station is selected (time=0 seconds), the pilot signals spike to their respective energy levels almost instantaneously. Without a low pass filter, such response times are possible, but with a significant throughput of noise, which may cause the receiver to switch from monophonic to stereophonic mode and vice versa too frequently when comparing the pilot tone energy against a predetermined threshold. Thus, it is desirable to create a receiver system where the throughput of such noise is minimized.

FIG. 7 shows a diagram 700 that illustrates results of a simulation for a filtered pilot energy signal similar to smooth pilot energy signal described in FIG. 4. This simulation illustrates the performance of various pilot energy signals after being smoothed by a low pass filter with a constant leakage factor $\rho$, such as one of low pass filters 420 or 425 described in FIG. 4. The low pass filter used in this simulation includes the following transfer function H(z) where $\rho$ is the leakage factor and z is a delay factor.

$$H(z) = \frac{\rho}{1 - (1 - \rho)z^{-1}}$$

Although a low pass filter with the above transfer function is used in the simulations, it should be appreciated that a filter with any transfer function that is appropriate for the purpose described herein may be used to filter the pilot energy signal.

The simulations were performed for the same clean and noisy pilot energy signals as that of FIG. 6, but only after being filtered by a low pass filter with a constant leakage factor $\rho$ of $10^{-3}$. These pilot energy signals are indicated by reference numerals 71-78.

As shown in FIG. 7, filtered clean pilot energy signals 71, 73, 75, and 77 remain flat, and filtered noisy pilot energy signals 72, 74, 76, and 78 are much less noisy compared to the unfiltered pilot energy signals 62, 64, 66, and 68. However, filtering the pilot energy signals using a constant leakage factor $\rho$ introduces a significant response time lag. The pilot energy signals ramp up to their respective energy levels only after approximately 0.1 seconds. This time lag can be alleviated by utilizing a low pass filter with a varying leakage factor $\rho$, which results are described in greater detail with respect to FIG. 8.

FIG. 8 shows a diagram 800 that illustrates results of a simulation for a filtered pilot energy signal similar to smooth pilot energy signal described in FIG. 4. This simulation illustrates the performance of various pilot energy signals after being smoothed by a low pass filter with a varying leakage factor $\rho$, such as one of low pass filters 420 or 425 described in FIG. 4.

The simulations were performed for the same clean and noisy pilot energy signals as that of FIG. 6, but only after being filtered by a low pass filter with a varying leakage factor $\rho$ that is decreased from $2^{-4}$ to $2^{-12}$ in an appropriate manner. For example, the leakage factor $\rho$ can be gradually decreased from $2^{-4}$ to $2^{-12}$ using any technique and can be implemented using hardware, software or any combination of both. These pilot energy signals are indicated by reference numerals 81-88.

As shown in FIG. 8, filtered clean pilot energy signals 81, 83, 85, and 87 remain flat, and filtered noisy pilot energy signals 82, 84, 86, and 88 are even less noisy than filtered pilot energy signals 72, 74, 76, and 78. Moreover, the varying leakage factor $\rho$ gradually decreases from $2^{-4}$ to $2^{-12}$ over approximately 128 samples at 264.4 kHz, or over 4.5 ms. For example, leakage factor $\rho$ can be decreased with a step function by setting leakage factor $\rho$ to $2^{-4}$ and maintaining this value for a certain period of time, then stepping down leakage factor $\rho$ to $2^{-5}$ and maintaining this value for the same amount of time, and so on until leakage factor $\rho$ is stepped down to $2^{-12}$. Such a variation of leakage factor $\rho$ speeds up the response time of the receiver by a significant amount, for example, approximately 0.1 seconds. Specifically, a large leakage factor of about $2^{-4}$ allows for a fast response time, while also allowing for some throughput of noise. However, a small leakage factor of about $2^{-12}$ slows the response time, but greatly decreases any noise throughput, thus resulting in a pilot energy signal with very little noise. Accordingly, if a large leakage factor is used in the beginning for a fast response time, and is gradually decreased to a low leakage factor to decrease the noise throughput, a filtered pilot energy signal with a fast response time and low noise throughput can be achieved, resulting in greatly reduced switching between monophonic and stereophonic modes in the receiver.

Although the simulations shown in FIGS. 7-8 implement filters with a constant leakage factor ρ of $10^{-3}$ or a leakage factor ρ that varies between $2^{-4}$ and $2^{-12}$, it should be appreciated that a leakage factor ρ of any value or range may be implemented for any duration of time, over any number of samples, or at any frequency, as appropriate for the purpose described herein. Furthermore, the leakage factor may be programmable and/or adjusted by a user during operation of the receiver.

Figure 9:
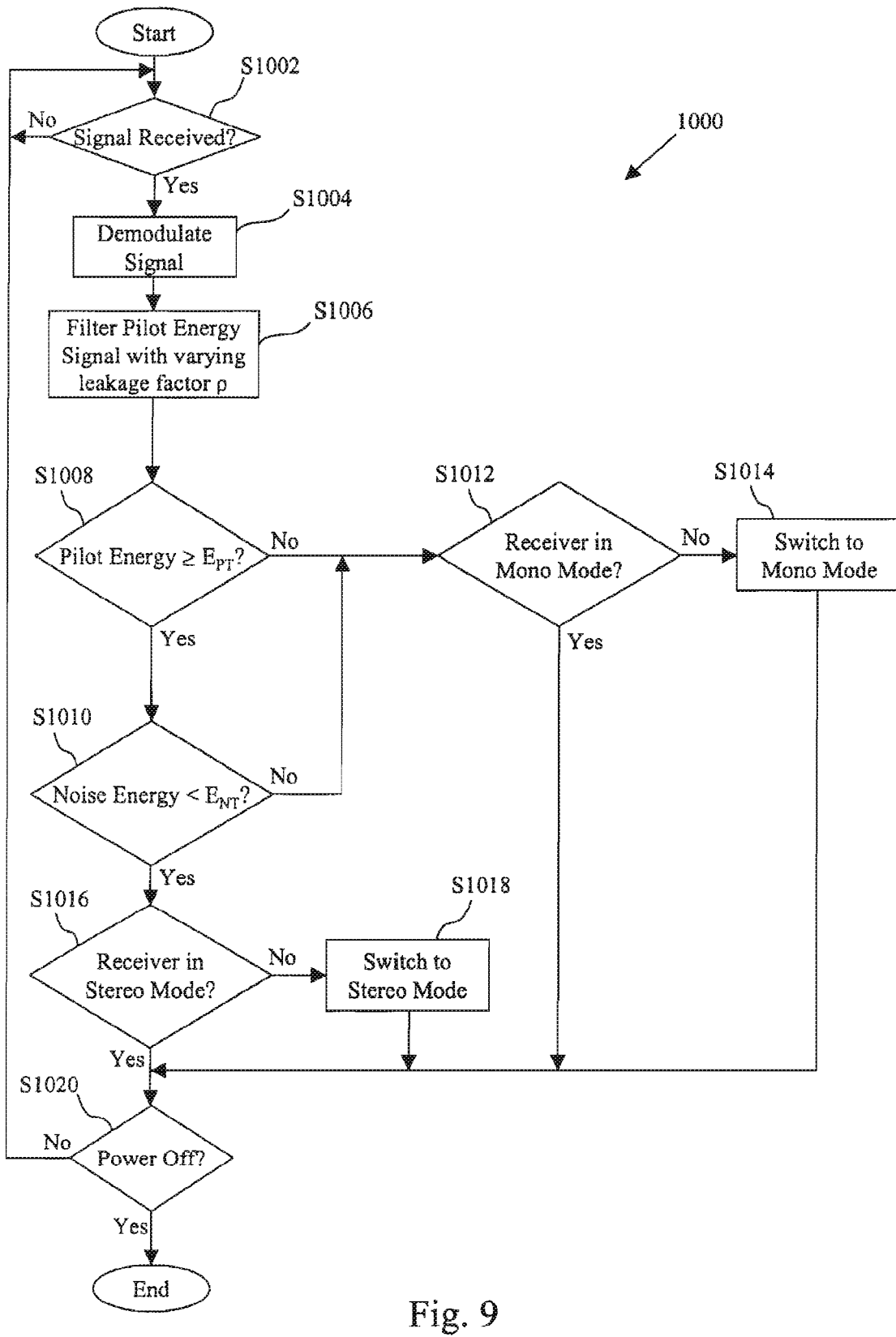
FIG. 9 shows a flow-chart of an exemplary MSD process for detecting a stereophonic signal using a variable leakage factor $\rho$.

FIG. 9 shows a flow-chart 1000 of an exemplary mono/stereo detection process. The exemplary MSD process can be implemented in a receiver where frequent switching between monophonic and stereophonic modes needs to be reduced, such as the receiver shown in FIG. 1.

The process begins and proceeds to step S1002 where a determination is made as to whether a signal is received. If a signal is not received, then the process returns to step S1002. Otherwise, the process proceeds to step S1004.

In step S1004, the process demodulates the received signal and proceeds to step S1006. For example, in receiver 100, demodulator 110 demodulates base line signal BS into a multiplex signal MPX.

In step S1006, the process filters the pilot energy signal with a varying leakage factor ρ and proceeds to step S1008. For example, in receiver 100, filters 420 and 425 filter sample pilot energy signal with varying leakage factor ρ from a large value to a small value, as described with reference to FIGS. 4 and 8.

In step S1008, a determination is made as to whether a pilot energy of a detected pilot signal is greater than or equal to pilot energy threshold $E_{PT}$. If pilot energy of detected pilot signal is less than pilot energy threshold $E_{PT}$, then the process proceeds to step S1012. Otherwise, the process proceeds to step S1010.

In step S1010, a determination is made as to whether a noise energy of detected pilot signal is less than noise energy threshold $E_{NT}$. If noise energy of detected pilot signal is greater than or equal to noise energy threshold $E_{NT}$, then the process proceeds to step S1012. Otherwise, the process proceeds to step S1016.

In step S1012, a determination is made as to whether the receiver is in mono mode. If the receiver is not in mono mode, the process proceeds to step S1020. Otherwise, the process proceeds to step S1014.

In step S1014, the process switches the receiver to mono mode and proceeds to step S1020. For example, in threshold comparator 230 of receiver 100, if sample pilot energy signal SPE has an energy level less than that of pilot energy threshold $E_{PT}$, which means that the pilot signal is absent or very weak, MSI generator 450 will generate a mono/stereo indicator signal MSI instructing the receiver to switch to mono mode if it is not already in mono mode. Also, even if sample pilot energy signal SPE is equal to or greater than pilot energy threshold $E_{PT}$, but has a residual signal having noise energy greater than or equal to that of noise energy threshold $E_{NT}$, MSI generator 450 will generate a mono/stereo indicator signal MSI instructing the receiver to switch to mono mode if it is not already in mono mode.

In step S1016, a determination is made as to whether the receiver is in stereo mode. If the receiver is not in stereo mode, the process proceeds to step S1018. Otherwise, the process proceeds to step S1020.

In step S1018, the process switches the receiver to stereo mode and proceeds to step S1020. For example, if sample pilot energy signal SPE satisfies both energy and noise threshold requirements of PEC 410 and NEC 440, MSI generator 450 will generate a mono/stereo indicator signal MSI instructing the receiver to switch to stereo mode if it is not already in stereo mode.

In step S1020, the process determines whether the receiver is powered off. If the receiver is not powered off, then the process returns to step S1002. Otherwise, the process ends.

Pilot energy thresholds $E_{PT}$ and noise energy threshold $E_{NT}$ may be either fixed or variable. Depending on design parameters, operating conditions, or the mere preference of a user, $E_{PT}$ and $E_{NT}$ may be either manually or automatically adjusted to maximize the performance of the receiver system incorporating the mono/stereo detector. For example, if need be, the user can raise the noise energy threshold $E_{NT}$ to enjoy a stereophonic sound at the expense of an increase in noise.

Furthermore, it should be appreciated that mono/stereo detector MSD can detect pilot energy signals of stereophonic broadcasts at both 50 kHz and 75 kHz rated maximum system deviation RMSD.

For purposes of explanation, in the above description, numerous specific details are set forth in order to provide a thorough understanding of the mono/stereo detector MSD. It will be apparent, however, to one skilled in the art that MSD can be practiced without these specific details. In other instances, well-known structures and devices are shown in block diagram form in order to avoid obscuring the MSD.

While the MSD has been described in conjunction with the specific embodiments thereof, it is evident that many alternatives, modifications, and variations will be apparent to those skilled in the art. Accordingly, embodiments of the MSD as set forth herein are intended to be illustrative, not limiting. There are changes that may be made without departing from the spirit and scope of the invention.

What is claimed is:

1. A receiver comprising:
an extractor that extracts a pilot energy signal from an input signal; and
a filter that filters the pilot energy signal to generate a filtered pilot energy signal, wherein a varying of a continuous leakage factor associated with the filter is used to minimize a noise level of the filtered pilot energy signal and to reduce a response time of the receiver.

2. The receiver of claim 1, further comprising:
a mono/stereo detector that causes the receiver to output either a monophonic or a stereophonic signal based on a residual signal that is indicative of a difference between the pilot energy signal and the filtered pilot energy signal.

3. The receiver of claim 2, further comprising:
a noise energy comparator that compares the residual signal with a noise energy threshold to generate a channel condition signal, and causes the receiver to output either the monophonic or stereophonic signal based on the channel condition signal.

4. The receiver of claim 3, further comprising:
a pilot energy comparator that compares the filtered pilot energy signal with a pilot energy threshold to generate an energy level signal, and causes the receiver to output either the monophonic or stereophonic signal based on the energy level signal.

5. The receiver of claim 4, further comprising: a mono/stereo indicator that generates a mode signal based on the channel condition signal and the energy level signal, and causes the receiver to output either the monophonic or stereophonic signal based on the mode signal.

6. The receiver of claim 5, wherein the mono/stereo indicator causes the receiver to output the monophonic signal when a total residual energy signal is greater than or equal to the noise energy threshold.

7. The receiver of claim 5, wherein the mono/stereo indicator causes the receiver to output the monophonic signal when the filtered pilot energy signal is less than the pilot energy threshold.

8. The receiver of claim 5, wherein the mono/stereo indicator causes the receiver to output the stereophonic signal when a total residual energy signal is less than the noise energy threshold, and when the filtered pilot energy signal is greater than or equal to the pilot energy threshold.

9. The receiver of claim 1, wherein the continuous leakage factor is varied between a first value and a second value.

10. The receiver of claim 9, wherein the first value is $2^{-4}$.

11. The receiver of claim 10, wherein the second value is $2^{-12}$.

12. The receiver of claim 11, wherein the continuous leakage factor is varied for a predetermined number of samples at a predetermined frequency.

13. The receiver of claim 1, wherein the filter is a 1-tap IIR low-pass filter.

14. A method for switching a mode of a receiver, comprising:
    extracting a pilot energy signal from an input signal;
    filtering the pilot energy signal to generate a filtered pilot energy signal; and
    varying a continuous leakage factor during the step of filtering to minimize a noise level of the filtered pilot energy signal and to reduce a response time of the receiver.

15. The method of claim 14, further comprising:
    outputting either a monophonic or a stereophonic signal based on a residual signal that is indicative of a difference between the pilot energy signal and the filtered pilot energy signal.

16. The method of claim 15, further comprising:
    comparing the residual signal with a noise energy threshold to generate a channel condition signal; and
    outputting either the monophonic or stereophonic signal based on the channel condition signal.

17. The method of claim 16, further comprising:
    comparing the filtered pilot energy signal with a pilot energy threshold to generate an energy level signal; and
    outputting either the monophonic or stereophonic signal based on the energy level signal.

18. The method of claim 17, further comprising:
    outputting the monophonic signal when the residual signal is greater than or equal to the noise energy threshold.

19. The method of claim 17, further comprising:
    outputting the monophonic signal when the filtered pilot energy signal is less than the pilot energy threshold.

20. The method of claim 17, further comprising:
    outputting the stereophonic signal when the residual signal is less than the noise energy threshold, and when the filtered pilot energy signal is greater than or equal to the pilot energy threshold.

21. The method of claim 14, wherein the leakage factor is varied between a first value and a second value.

22. The method of claim 21, wherein the first value is $2^{-4}$.

23. The method of claim 22, wherein the second value is $2^{-12}$.

24. The method of claim 23, wherein the continuous leakage factor is varied for a predetermined number of samples at a predetermined frequency.

* * * * *